United States Patent
Monteleone

(12) 
(10) Patent No.: US 6,718,865 B1
(45) Date of Patent: Apr. 13, 2004

(54) GRILL SPACE SAVER

(76) Inventor: Donald J Monteleone, 106 Oak Ridge Dr., Butler, PA (US) 16002

( * ) Notice: Subject to any disclaimer, the term of this patent is extended or adjusted under 35 U.S.C. 154(b) by 0 days.

(21) Appl. No.: 10/323,308

(22) Filed: Dec. 18, 2002

(51) Int. Cl.[7] .............................. A47J 37/00; A47J 37/07
(52) U.S. Cl. .............................. 99/340; 99/448; 99/450; 99/482; 126/25 R; 126/9 R
(58) Field of Search .................. 99/339, 340, 352–355, 99/444–450, 481, 482; 126/25 R, 9 R, 9 A, 39 R, 41 R, 39 E; 426/523, 520; 248/237, 235, 236, 241, 118, 243; 108/38, 42, 48, 39, 117, 134, 147.11, 109.27, 149, 152; 211/182, 193, 135, 90.01, 153

(56) References Cited

U.S. PATENT DOCUMENTS

| | | | |
|---|---|---|---|
| 19,700 A | | 3/1858 | Kennedy |
| 27,441 A | | 3/1860 | Gifford |
| 945,428 A | | 1/1910 | Wendt |
| 1,004,597 A | | 10/1911 | Smith |
| 2,038,646 A | | 4/1936 | Ciscognetti |
| 2,469,657 A | | 10/1949 | Linda et al. |
| 3,139,045 A | | 6/1964 | Rojakovick |
| 3,611,915 A | * | 10/1971 | Glaser et al. .................. 99/445 |
| 4,074,635 A | | 2/1978 | Stauble |
| 4,250,815 A | | 2/1981 | Swanson |
| 4,454,628 A | | 6/1984 | Olson |
| 4,869,451 A | | 9/1989 | Gordon |
| 5,404,795 A | * | 4/1995 | Coble .......................... 99/339 |
| 5,582,094 A | * | 12/1996 | Peterson et al. ............... 99/445 |
| 5,623,866 A | * | 4/1997 | Home .......................... 99/444 |
| 5,628,242 A | * | 5/1997 | Higley ......................... 99/332 |
| 5,655,437 A | * | 8/1997 | Vitacca ........................ 99/400 |
| 5,865,099 A | * | 2/1999 | Waugh ......................... 99/340 |
| 5,934,183 A | * | 8/1999 | Schlosser et al. .............. 99/385 |
| 5,947,007 A | * | 9/1999 | O'Grady et al. ............... 99/340 |
| 6,012,381 A | * | 1/2000 | Hawn .......................... 99/340 |
| 6,058,832 A | * | 5/2000 | Fountain ...................... 99/446 |
| 6,263,783 B1 | * | 7/2001 | Liu ............................. 99/339 |
| 6,397,731 B1 | * | 6/2002 | Gillespie et al. .............. 99/339 |

* cited by examiner

*Primary Examiner*—Timothy F. Simone
(74) *Attorney, Agent, or Firm*—Michael I Kroll

(57) ABSTRACT

The present invention (10) discloses a grill platform (14) having brackets (22) having apertures (24) therein for inserting fasteners (32) for attachment to a structure such as an outdoor deck (12) with the platform (14) being supported by the brackets (22). The brackets (22) are selectively placed providing means to mount the grill platform (14) at a variable height on the deck (12) structure so that the grilling surface is at an optimal height. A planar rectangular-shaped platform (14) is mounted upon the brackets (22) and provides a planar surface for the placement of a grill (16). The tray (14) can be mounted flush to a vertical upright of the angle bracket, or offset to suit the deck structural elements. The platform (14) also provides a hole (30) for drainage of water and other outdoor contaminating elements. Hook and loop straps (20) are selectively positioned and affixed to the legs (18) of the grill (16) and deck structure (12) to prevent undesired movement of the grill (16) from the platform (14).

11 Claims, 9 Drawing Sheets

GRILL SPACE SAVER

BACKGROUND OF THE INVENTION

1. Field of the Invention

The present invention relates generally to a platform and hanger apparatus, more specifically, to a platform for supporting a barbeque grill consisting of hanger brackets having apertures for inserting fasteners for attachment to a structure such as an outdoor deck.

Despite the hazards with barbeque grilling in confined areas, many urban and suburban dwellers are forced to utilize an outdoor deck for outdoor cooking needs. Although decks are popular places to barbeque, people are often unaware that leaves, dry grass, and other combustible materials collect under them. If a smoldering match is dropped between the boards, it may ignite these materials and the deck. If your deck is close to, or attached to your home, this could present a very serious fire hazard.

In addition to the fire hazards, placement of the barbeque grill on the deck can lead to serious burns caused by hot grease and grill surfaces. Furthermore, placement of the barbeque grill on the deck can lead to deck stains from dripping grease.

The present invention overcomes such hazards by providing means to position the barbeque grill outside the useable surface area of the deck. The present invention grill platform consists of brackets having apertures for inserting fasteners for attachment to a structure such as an outdoor deck with a planar element supported by said brackets.

In addition to reducing fire hazards, the placement of the barbeque grill outside the useable floor space provides means to save deck space. This positioning also eliminates the possibility of staining the deck with grease. Furthermore, the positioning barbeque grill reduces the chances of a person or child from getting burned from the hot surfaces.

The present invention provides two brackets having mounting apertures. The brackets are selectively placed providing means to mount the grill platform at a variable height to the deck structure so that the grilling surface is at an optimal height. A planar rectangular shaped tray is mounted upon the brackets and provides a deck surface for the placement of a barbeque grill. The tray can be mounted flush to vertical upright of the angle bracket, or offset to suit the deck structural elements. The tray also provides a hole for drainage of water and other outdoor contaminating elements.

In addition, the present invention provides means to secure the barbeque grill to the deck structure. Hook and loop straps are selectively positioned and affixed to the legs of the barbeque grill and deck structure to prevent undesired movement of the barbeque grill from the platform tray.

2. Description of the Prior Art

There are other platform and hanger apparatuses. Typical of these is U.S. Pat. No. 19,700 issued to J. W. Kennedy on Mar. 23, 1858.

Another patent was issued to T. J. Gifford on Mar. 13, 1860 as U.S. Pat. No. 27,441. Yet another U.S. Pat. No. 883,001 was issued to G. W. Curtis on May 28, 1907 and still yet another was issued on Sep. 16, 1908 to E. F. Wendt as U.S. Pat. No. 945,428.

Another patent was issued to M. H. Smith on Oct. 3, 1911 as U.S. Pat. No. 1,004,597. Yet another U.S. Pat. No. 2,038,646 was issued to V. Ciscognetti on Jan. 2, 1935. Another was issued to J. W. Linda on May 10, 1949 as U.S. Pat. No. 2,469,657 and still yet another was issued on Jun. 30, 1964 to J. Rojakovick as U.S. Pat. No. 3,139,045.

Another patent was issued to Alfred G. Stauble on Feb. 21, 1978 as U.S. Pat. No. 4,074,635. Yet another U.S. Pat. No. 4,250,815 was issued to Richard H. Swanson on Feb. 17, 1981. Another was issued to Duane G. Olson on Jun. 19, 1984 as U.S. Pat. No. 4,454,628 and another U.S. Pat. No. 4,869,451 was issued to Richard A. Gordon on Sep. 26, 1989.

U.S. Pat. No. 19,700

Inventor: J. W. Kennedy

Issued: Mar. 23, 1858

The nature of this invention consists in providing a new and useful improvement in the fastenings to hold carpenters' brackets while the building is being built or repaired.

U.S. Pat. No. 27,441

Inventor: T. J. Gifford

Issued: Mar. 13, 1860

The object of this invention is to enable the workmen to erect a staging with greater ease and with the same security than by the present mode; and to secure the brackets upon which the footboards are laid, to a wooden building, either before or after plastering, which in the latter instance cannot be done with the present mode of attaching the brackets. The attachment can be readily made by one man, and the staging can be removed and the whole taken down with ease and facility.

U.S. Pat. No. 883,001

Inventor: G. W. Curtis

Issued: Mar. 24, 1908

The object of this invention is to provide a simple, strong, and durable shelf, which can be removably mounted at the frame of a window and which is adapted to fit windows of different sizes. A further object of this invention is to provide a shelf comprising carrying members adapted to be removably attached to window frames and the like without material injury thereto, and extensible shelves or pans removably arranged upon said carrying members.

U.S. Pat. No. 945,428

Inventor: E. F. Wendt

Issued: Jan. 4, 1910

The object of this invention is to provide an attachment for scaffolds wherein standards, beams and cross braces ordinarily used in the construction of scaffolding will be eliminated and the disfigurement of the walls of buildings incident to their use reduced to a minimum.

U.S. Pat. No. 1,004,597

Inventor: M. H. Smith

Issued: Oct. 3, 1911

The object of this invention is to provide a sink bracket or frame structure which can be readily and effectively attached to the lath and plaster wall at any desired location, and shall be adjustable to different sizes of sinks and which, while it is adequately supported, does not obstruct the wall space which is usually occupied by the plumbing.

U.S. Pat. No. 2,038,646

Inventor: V. Ciscognetti

Issued: Apr. 28, 1936

This invention relates to a structure which may be broadly referred to as a attachment for a window sill, and it has more specific reference to a device which is designed for home or domestic use and which serves a two-fold purpose.

U.S. Pat. No. 2,469,657

Inventor: J. W. Linda et al.

Issued: May 10, 1949

This invention relates to automobile accessories and more particularly to a tray adapted to be secured the back of a front seat of an automobile, so that it may serve as a table for any occupant of the back seat of the automobile.

U.S. Pat. No. 3,139,045

Inventor: J. Rojakovick

Issued: Jun. 30, 1964

This invention relates to new to useful adjustable shelving and shelving hangers. While many types of shelving and shelving brackets and hangers exit for various purposes, a great many are simply not adapted to be hung from or supported by a horizontal surface. The shelving and hangers of this invention are both adjustable and peculiarly adapted to be suspended from a horizontal surface. Not only does this invention provide shelving which is adjustable vertically, but it also facilitates the practical utilization of shelves of widely varying contours and size.

U.S. Pat. No. 4,074,635

Inventor: Alfred G. Stauble

Issued: Feb. 21, 1978

An integrally molded, one-piece, plastic shelf unit which can be mounted directly on a surface either singly, or adjacent similar units, without the need for separate mounting structures such as brackets, and which is nestable for convenient shipment and storage is disclosed. It has a flat horizontal support wall, an integral front wall which extends downwardly from the front edge of the support wall, integral sidewalls which extend downwardly from the side edges of the support wall, and an integral external mounting flange wall which extends outwardly from the rear edges of the support wall and the sidewalls to provide an unobstructed rear opening in which a similar unit may be nested.

U.S. Pat. No. 4,250,815

Inventor: Richard H. Swanson

Issued: Feb. 17, 1981

An easily mountable and repositionable cantilevered shelf supported from the rear wall of a commercial refrigerator or freezer cabinet on two vertical support members secured inside on the rear wall. Each support member has longitudinal flanges projecting forward from an elongate vertical base fastened to the rear wall and formed with front channels facing toward the base part, opposed flanges of the channels of the two support members having notches along their length. Shelves are made from rod and wire construction with a solid cross bar across the rear upper shelf edge. The ends of the cross bar project laterally as short trunnions and hook into matched pairs of notches in the facing channel flanges of each support. Rearwardly projected lower rods incline downwardly and rearwardly on each side of the shelf and their ends abut against the mid-portions of the support channels so the shelf can be fulcrumed about the abutments to lock the trunnion ends of the cross bar into the associated, rearward directed, facing notches.

U.S. Pat. No. 4,454,628

Inventor: Duane G. Olson

Issued: Jun. 19, 1984

A fish-cleaning table for use in the home by attaching it to or suspending it from a sink having a drain and a faucet. The table has a rectangular vacuum-molded body having a higher end and a lower end with a drain opening. A series of slats run lengthwise over the body, supported by cross members which rest on notches in the body. The body is held on the sink by short, hook-shaped legs which fold outward from the body, and is supported by legs which pivot downward and contact the sink at a lower point than the hooks. A water spraying system, which connects to the sink's faucet as a source of water, sprays water onto the slats to continuously wash them. This water then washes the debris from cleaning the fish down between the slats and into the drain opening of the body. There a straining means catches the solid particles, and allows the liquid to continue down the drain of the sink. Means for attaching a trash bag for disposal of the larger solid waste items during cleaning and for emptying the straining means afterward is provided at the high end of the body.

U.S. Pat. No. 4,869,451

Inventor: Richard A. Gordon

Issued: Sep. 26, 1989

A shelf is provided for use in combination with a window having a window sill formed of a planar rectangular body having the rear edge adapted to rest on the window sill adjacent the window. Bracing means are provided for supporting the body at a level with the window sill, by creating at least one slot extending perpendicularly to its rear edge of the body into which and from which a bearing member is freely suspended. The bearing member has detents at the upper end which cause the member to slideably engage with the surface of the body so as to restrict the complete axial passage through the slot. A connecting rod is detachably secured at one end to the lower end of the bearing member and at its opposite end to the front end of the upper surface of the body. The connecting rod has a predetermined length wherein the bearing member is simultaneously extended by its full axial length from the body and is pressed against the front edge of the window sill and forms a fixed right triangle.

While these platforms and hanger structures may be suitable for the purposes for which they were designed, they would not be as suitable for the purposes of the present invention, as hereinafter described.

SUMMARY OF THE PRESENT INVENTION

The present invention discloses a grill platform having brackets having apertures therein for inserting fasteners for attachment to a structure such as an outdoor deck with a planar platform being supported by the brackets. The brackets are selectively placed providing means to mount the grill platform at a variable height on the deck structure so that the grilling surface is at an optimal height. A planar rectangular-shaped platform is mounted upon the brackets and provides a surface for the placement of a grill. The platform can be mounted flush to a vertical upright of the angle bracket, or offset to suit the deck structural elements. The platform also provides a hole for drainage of water and other outdoor contaminating elements. Hook and loop straps are selectively positioned and affixed to the legs of the grill and deck structure to prevent undesired movement of the grill from the platform.

A primary object of the present invention is to provide means for a platform and hanger apparatus for attachment to a structure such as an outdoor deck.

Another object of the present invention is to provide means for a platform and hanger apparatus for supporting a barbeque grill.

Yet another object of the present invention is to provide means for a platform and hanger apparatus for supporting a barbeque grill outside the confines of useable space, thus saving deck space.

Still yet another object of the present invention is to provide means for a platform and hanger apparatus for supporting a barbeque grill outside the confines of useable space, thus reducing the risk of fire.

Another object of the present invention is to provide means for a platform and hanger apparatus for supporting a barbeque grill outside the confines of useable space, thus reducing the risk of getting burned by grill surfaces.

Yet another object of the present invention is to provide means for a platform and hanger apparatus for supporting a barbeque grill outside the confines of useable space, thus eliminating the risk of getting grease stains on the deck surface.

Still yet another object of the present invention is to provide means for a platform and hanger apparatus for supporting a barbeque grill at selective height, thus optimizing the height of the barbeque grill surface.

Another object of the present invention is to provide means for a platform and hanger apparatus for supporting a barbeque grill that is safe to use.

Yet another object of the present invention is to provide means to secure the barbeque grill to the deck structure using removable and adjustable hook and loop straps.

Another object of the present invention is to provide means for a platform and hanger apparatus for supporting a barbeque grill that is cost effective for consumers and to manufacture.

Additional objects of the present invention will appear as the description proceeds.

The present invention overcomes the shortcomings of the prior art by providing various means to promote and increase safe use of barbeque grills on outdoor deck and other similar surfaces.

The foregoing and other objects and advantages will appear from the description to follow. In the description, reference is made to the accompanying drawings, which form a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
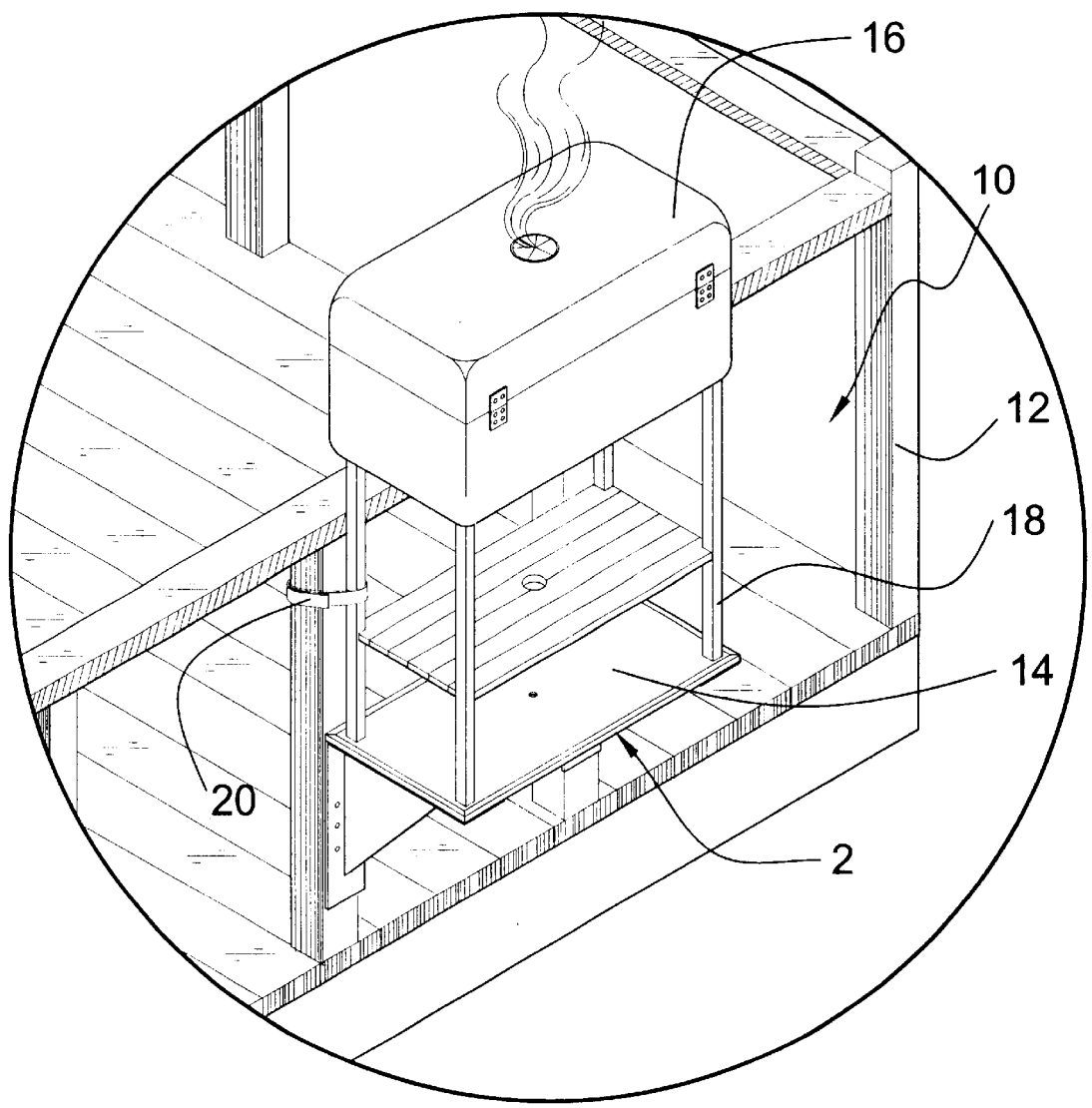
FIG. 1 is an illustrative view of the present invention in use.

With regard to reference numerals used, the following numbering is used throughout the drawings.

10 present invention
12 deck
14 tray
16 grill
18 legs
20 straps
22 bracket
24 mounting aperture
26 flush mount
28 offset mount
30 drain hole
32 fastener
34 offset mount
36 solid gusset
38 open gusset

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10, being a grill platform, consists of brackets having apertures for inserting fasteners for attachment to a structure such as an outdoor deck 12 with a planar element 14 supported by the brackets. The device is designed to support a barbeque grill 16, saving space, eliminating deck stains and places the grill at a perfect height for use. By securing the grill 16 outside the usable surfaces of the deck 12, the present invention 10 provides a safety element limiting the chance of getting burned by the hot grease or grill surfaces. Additionally, hook and loop straps 20 are affixed to the legs 18 of grill 16 and structure 12 to prevent undesired movement of the grill.

Figure 2:
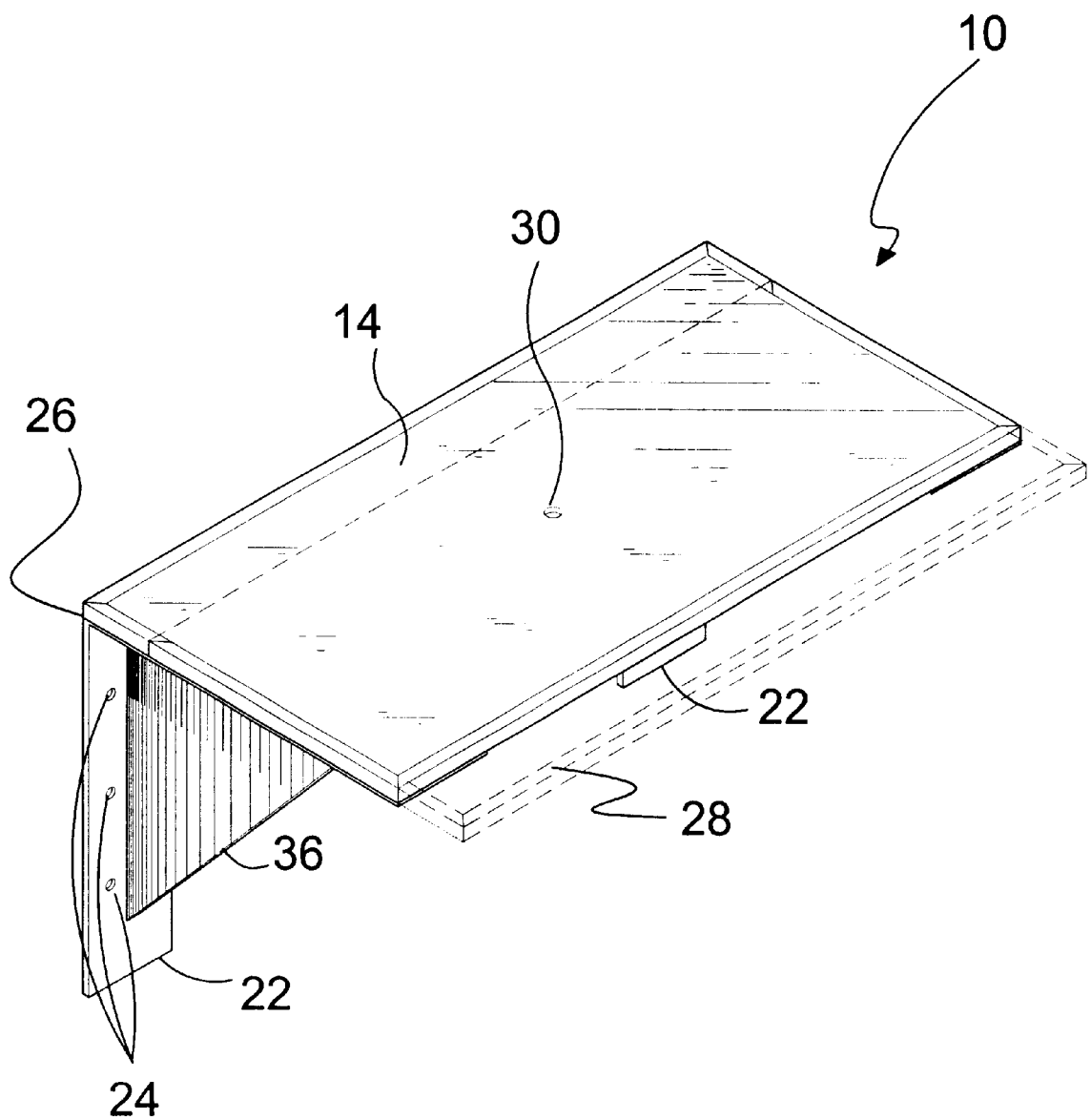
FIG. 2 is a perspective view of the present invention.

Turning to FIG. 2, shown therein is a perspective view of the present invention 10. The present invention 10 provides two angle brackets 22 having multiple mounting apertures 24. The brackets 22 are selectively placed and mounted to the frame structure of a deck. A planar rectangular shaped tray 14 is mounted upon the brackets 22 and provides a deck surface for the placement thereon of a barbeque grill. The tray 14 can be mounted flush to a vertical upright of the angle bracket as shown at 26, or offset at 28 to suit the deck structural elements. The tray 14 also provides a hole 30 for drainage. Also shown is solid gusset 36.

Figure 3:
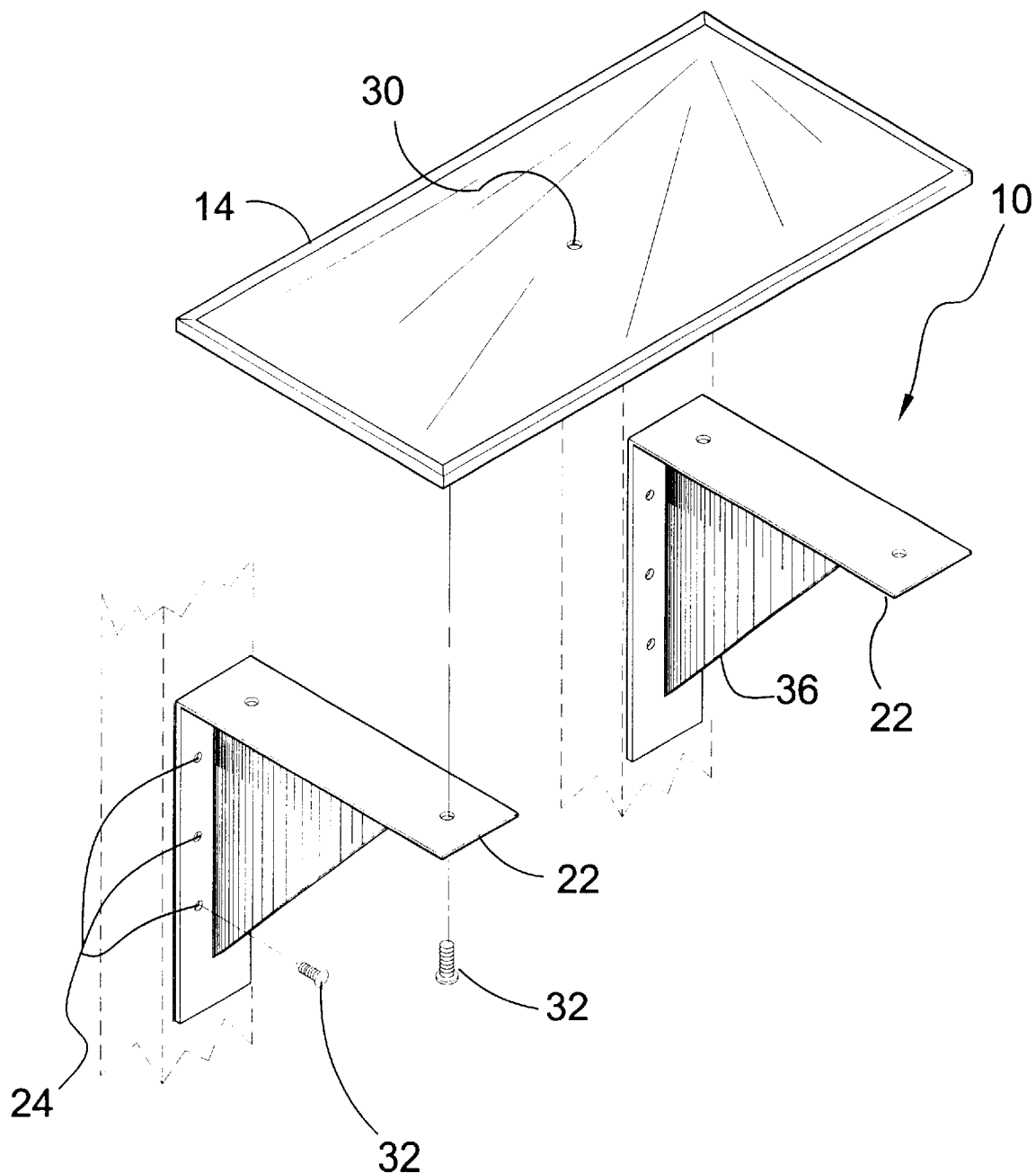
FIG. 3 is an exploded view of the present invention.

Turning to FIG. 3, shown therein is an exploded view of the present invention 10. Shown is an exploded view of the present invention consisting of two brackets 22 with gusset 36 having mounting apertures 24 for receiving fasteners 32, e.g., screws, and a planar, rectangular shaped tray or platform 14 that is positioned upon the brackets 22 for mounting a grill thereon. Platform 14 also has at least one drain hole 30 therein. Brackets 22 have a vertical leg and a horizontal leg at about a 90 degree angle with vertically spaced apart apertures being in the vertical leg.

Figure 4:
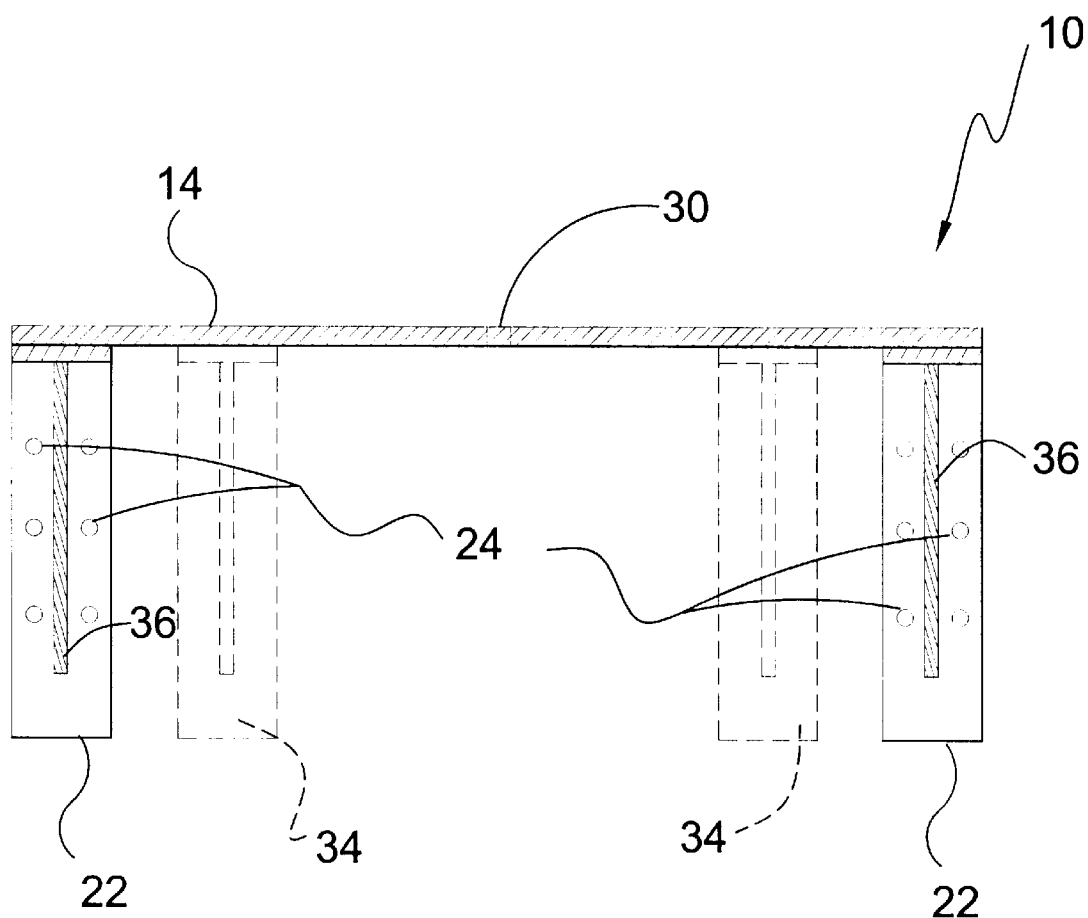
FIG. 4 is a front view of the present invention.

Turning to FIG. 4, shown therein is a front view of the present invention 10. Shown is a front view of the present invention 10 assembled with tray 14 resting upon the two provided brackets 22. The tray can be mounted flush to vertical upright of the angle bracket as shown, or offset as shown at 34 to suit the deck structural elements. Mounting holes 24 are also shown along with drain hole 30 and gusset 36.

Figure 5:
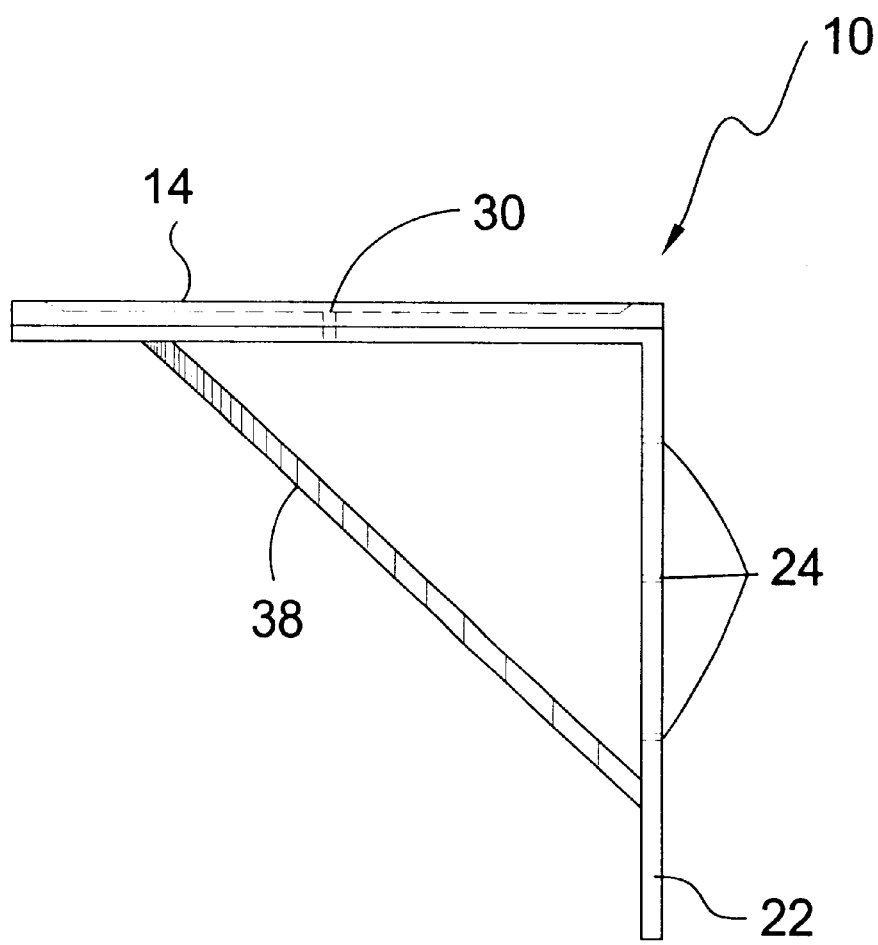
FIG. 5 is a side view of the present invention.

Turning to FIG. 5, shown therein is a side view of the present invention 10. Shown is a side view of the bracket 22 of the present invention 10, a grill platform 14, consisting of two brackets 22 having apertures 24 for inserting fasteners for attachment to a structure such as an outdoor deck with a tray 14 supported by the brackets 22. The supporting brace of the brackets 22 can be a solid gusset as previously depicted in FIGS. 2 and 3, or an open cross member gusset 38 as shown. Also shown is drain hole 30.

Figure 6:
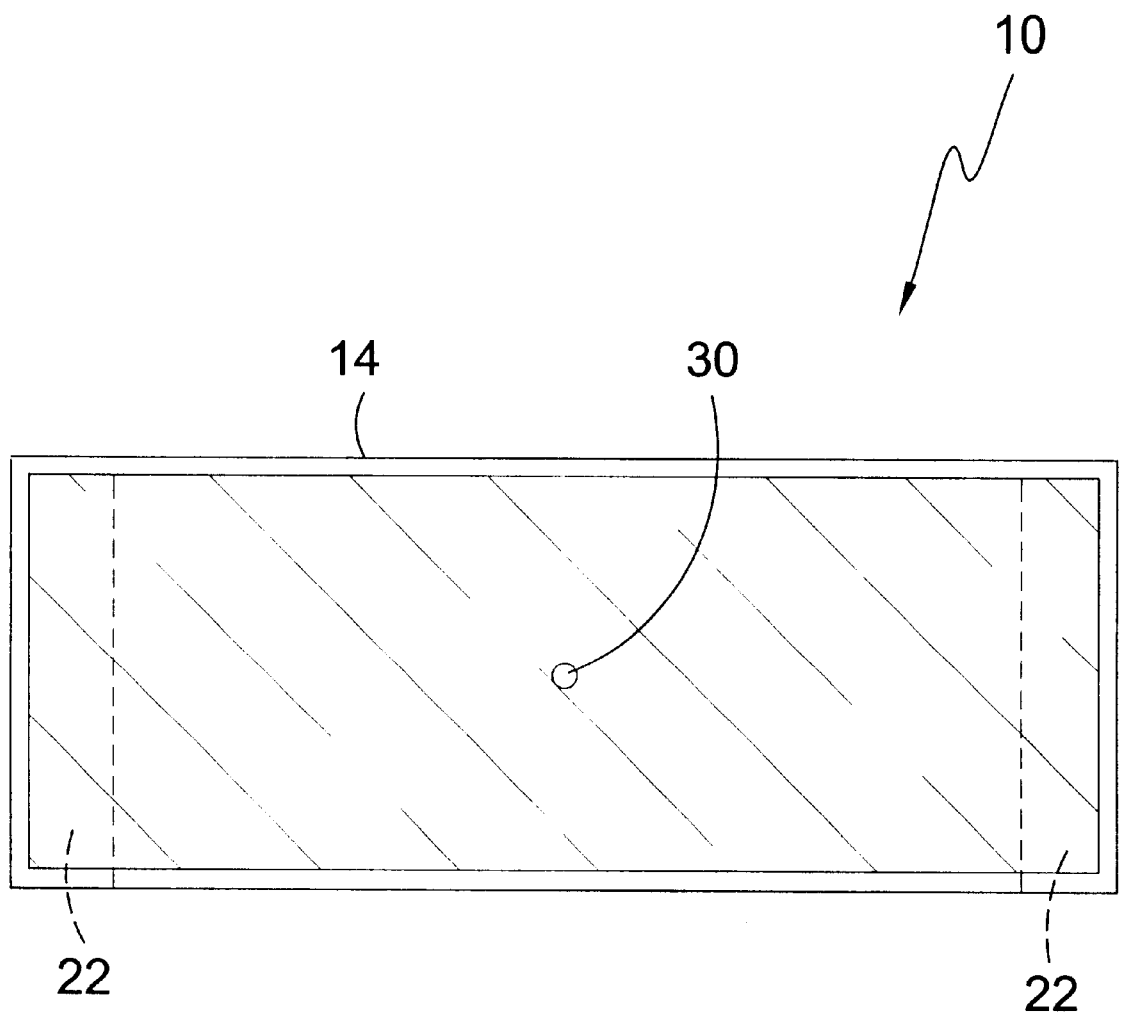
FIG. 6 is a top view of the present invention.

Turning to FIG. 6, shown therein is a top view of the present invention 10. Shown is a top view of the present invention 10 providing two brackets 22 having mounting apertures. The brackets 22 are selectively placed and mounted to a decks structure. A planar rectangular shaped tray 14 is fixedly attached upon the brackets 22 and provides a deck surface for the placement of a barbeque grill. The tray 22 also provides a drainage hole 30 for displacement of water or other fluid.

Figure 7:
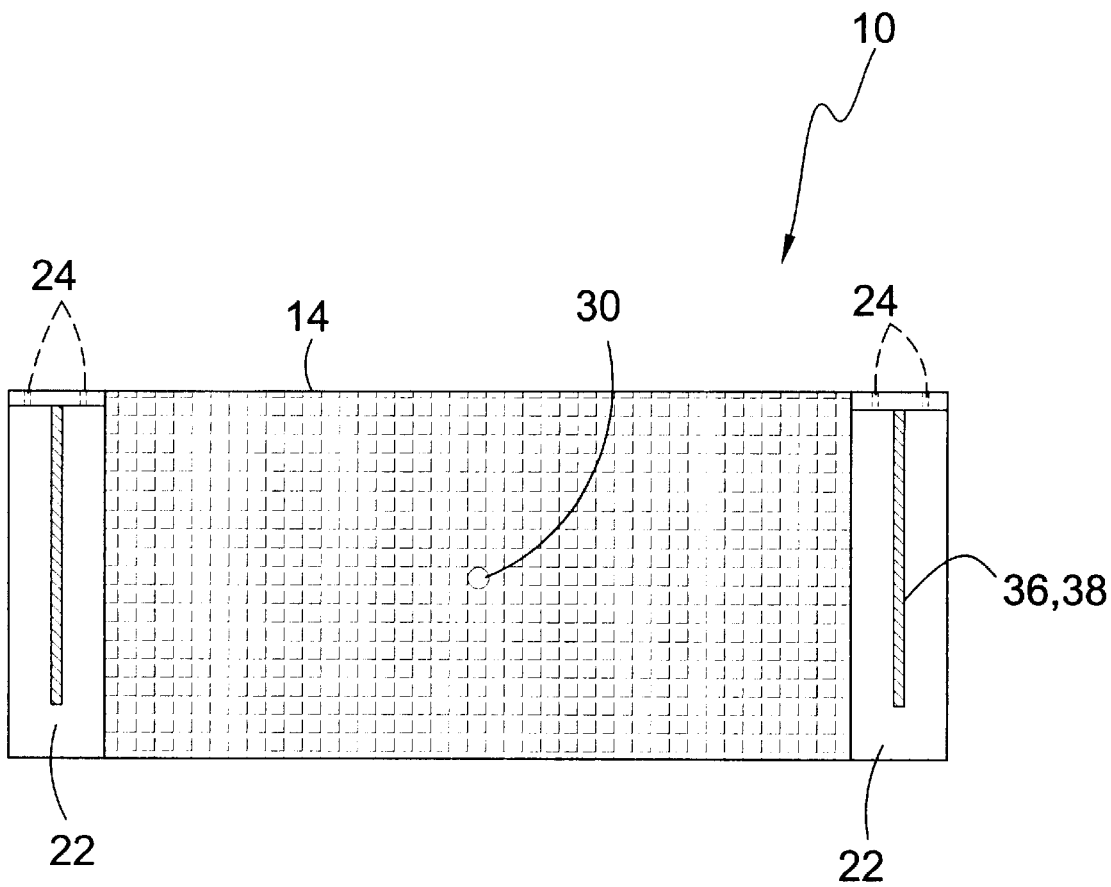
FIG. 7 is a bottom view of the present invention.

Turning to FIG. 7, shown therein is a bottom view of the present invention 10. Shown is a bottom view of the present invention 10, a grill platform 14, consisting of two brackets 22 having apertures 24 for inserting fasteners for attachment to a structure such as an outdoor deck with a planar element 14 supported by said brackets. Drain hole 30 is also shown.

Figure 8:
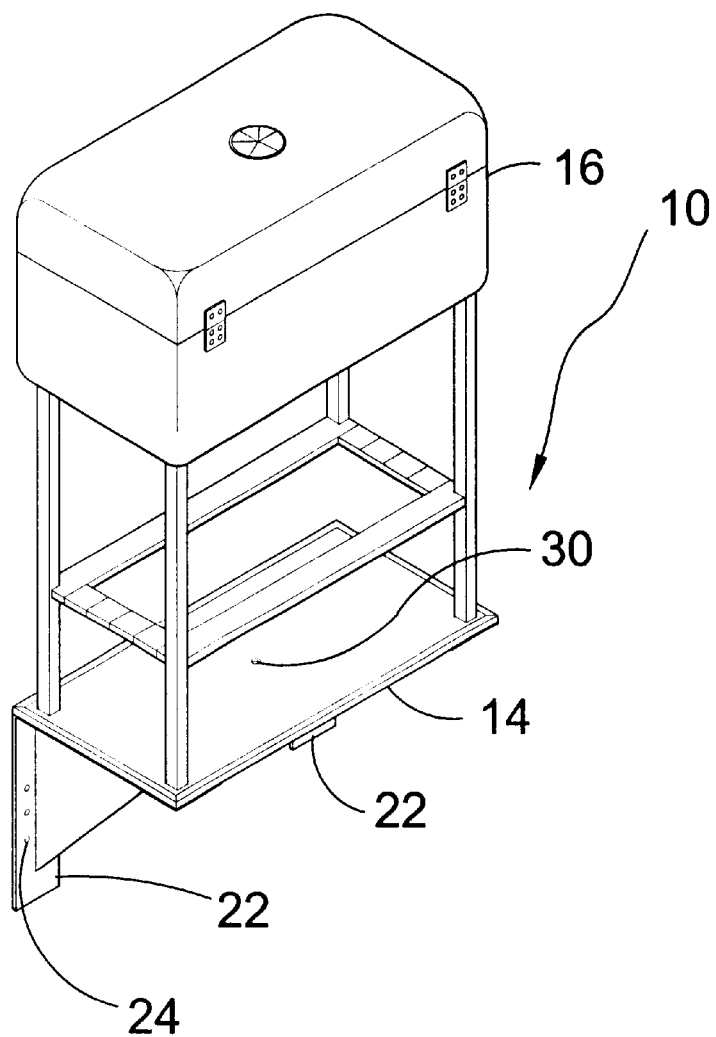
FIG. 8 is an illustrative view of the present invention in use.

Turning to FIG. 8, shown therein is an illustrative view of the present invention 10 in use. The present invention 10, a grill platform 14, consists of brackets 22 having apertures 24 for inserting fasteners for attachment to a structure such as an outdoor deck with a planar element 14 supported by the brackets 22. The device 10 is designed to support a barbeque grill 16, saving space, eliminating deck stains and places the grill 16 at a perfect height for use. Additionally, the platform provides a safety element limiting the chance of getting burned by the grease or grill surfaces. Also shown is drain hole 30.

Figure 9:
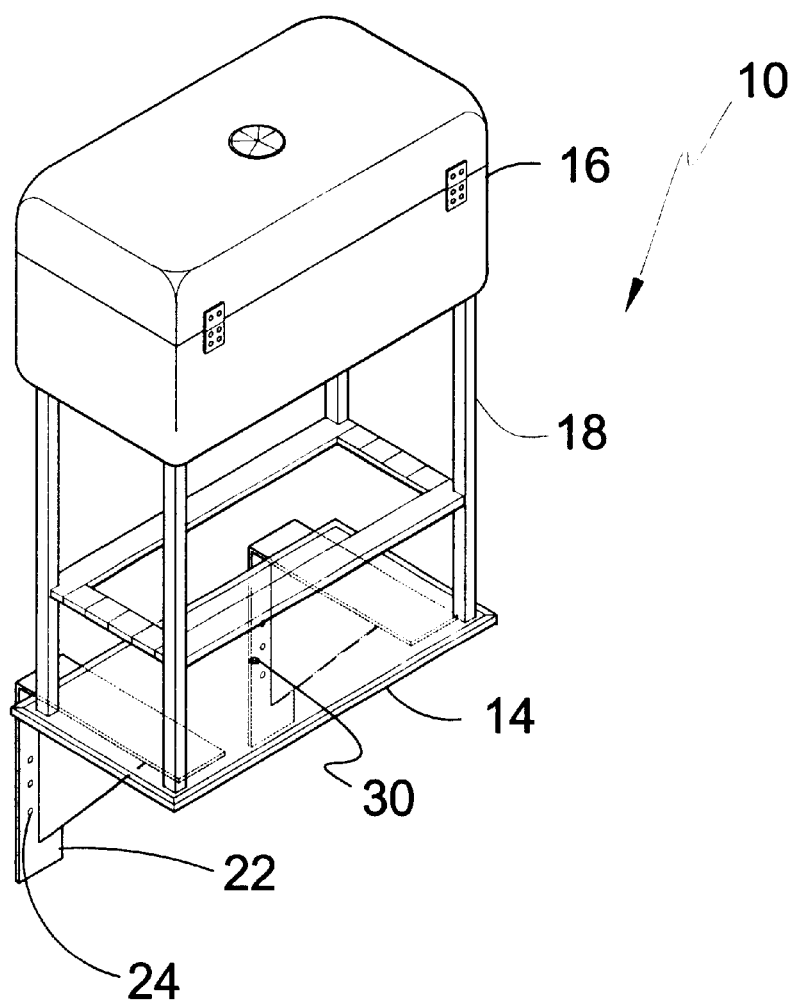
FIG. 9 is an illustrative view of the present invention in use.

Turning to FIG. 9, shown therein is an illustrative view of the present invention 10 in use. Depicted in FIG. 9 is the present invention's 10 grill platform 14 with an alternate securing position of the tray 14 on the brackets 22. The position of the tray 14 can be flush with the bracket 22, or offset in either direction as shown. Offsetting the tray position, and/or varying the brackets on-center distance allows the grill platform 14 to suit various structural elements in the mounting surface. Also shown are a grill 16 with legs 18 supported by tray 14, along with mounting holes 24 and drain hole 30.

What is claimed to be new and desired to be protected by Letters Patent is set forth in the appended claims.

I claim:

1. A platform for attachment to a deck for placement of a cooking grill thereon comprising:
  a) a deck having at least two upright standing members for attachment thereto of the platform;
  b) a cooking grill having a plurality of downwardly extending support legs, said legs for being placed on the platform;
  c) a pair of brackets being disposed on said upright standing members for supporting the platform, said brackets forming about a 90-degree angle having a substantially vertical leg and a substantially horizontal leg, said vertical leg having a plurality of vertically spaced apart apertures therein, said apertures for receiving a plurality of fasteners so that said brackets can be attached to said upright standing members so that the height of said brackets and the platform can be adjusted; and,
  d) a platform being disposed on said horizontal legs of said brackets, said platform for receiving said legs of said grill, said platform being substantially a planar, rectangular platform having a front edge, a rear edge, and a pair of side edges to permit the grill legs to be placed thereon.

2. The platform of claim 1, wherein each of said brackets is an angle bracket for supporting the platform.

3. The platform of claim 2, wherein a gusset extends form said vertical leg to said horizontal leg of said bracket for supporting the platform.

4. The platform of claim 3, wherein said gusset is a solid gusset.

5. The platform of claim 4, wherein said gusset is an open gusset.

6. The platform of claim 5, wherein said rear edge of said platform is mounted flush with said vertical leg of said bracket.

7. The platform of claim 6, wherein said rear edge of said platform is mounted offset from said vertical leg of said bracket.

8. The platform of claim 7, wherein said platform has a hole therein, said hole being horizontal to permit fluid to drain from the platform.

9. The platform of claim 8, wherein said fasteners for said brackets comprise screws.

10. The platform of claim 9, further comprising a plurality of straps for fastening said legs of said grill to said upright members of said deck, wherein said straps wrap around said legs of said grill and said upright members to permit the grill to be secured to the platform.

11. The platform of claim 10, wherein said straps comprise hook and loop material.

* * * * *